United States Patent [19]

Wortham

[11] Patent Number: 5,014,430
[45] Date of Patent: May 14, 1991

[54] PLYWOOD SAW

[76] Inventor: Charles D. Wortham, Rt. 1 Box 428, Shongaloo, La. 71072

[21] Appl. No.: 410,276

[22] Filed: Sep. 21, 1989

[51] Int. Cl.$^5$ ............................................. B23D 45/00
[52] U.S. Cl. ...................................... 30/166.3; 30/165
[58] Field of Search ...................... 30/166, 166.3, 381, 30/121, 475, 340; 318/493, 494, 517, 538, 543, 545; 16/111 A

[56] References Cited

U.S. PATENT DOCUMENTS 3,340,612  9/1967  Knight ............................... 30/166.3
3,715,805  2/1975  Fraser ................................ 30/166.3

Primary Examiner—Hien H. Phan
Assistant Examiner—Willmon Fridie, Jr.
Attorney, Agent, or Firm—John M. Harrison

[57] ABSTRACT

A plywood saw for cutting single or multiple plies of plywood, which saw is characterized by an elongated barrel fitted with a jigsaw at one end, a drive rod extending through the barrel and having one end connected to the reciprocating jigsaw blade mount and a blade pivotally attached to the opposite end of the drive rod and to a bracket mounted on the barrel for cutting sheets of plywood or individual plies thereof. Both curved and straight blades may be attached to the drive rod and bracket in the plywood saw, a "kill" switch is provided on a first handle extending from the barrel and a switch for operating the jigsaw is mounted on a second handle fitted to the barrel.

16 Claims, 2 Drawing Sheets

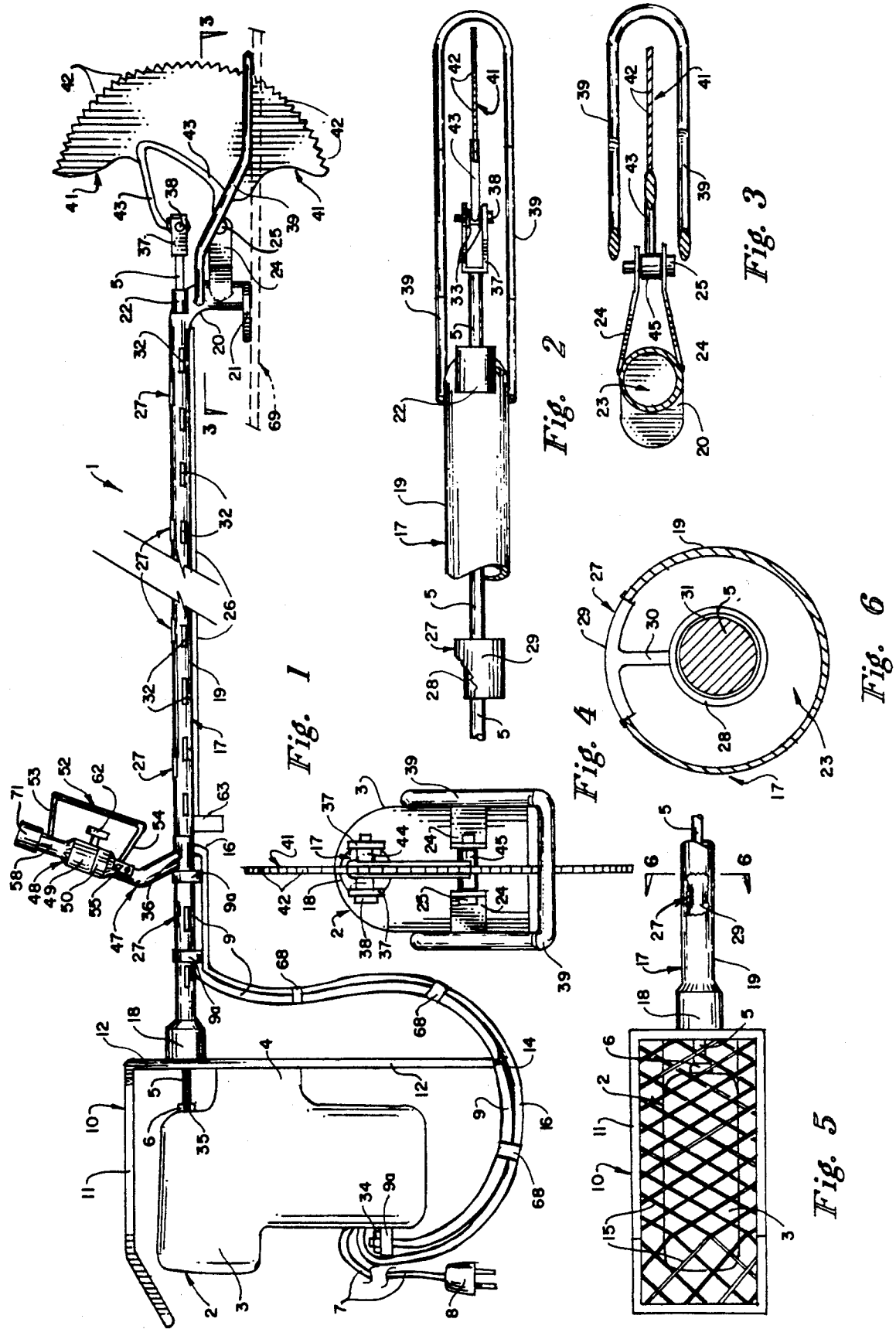

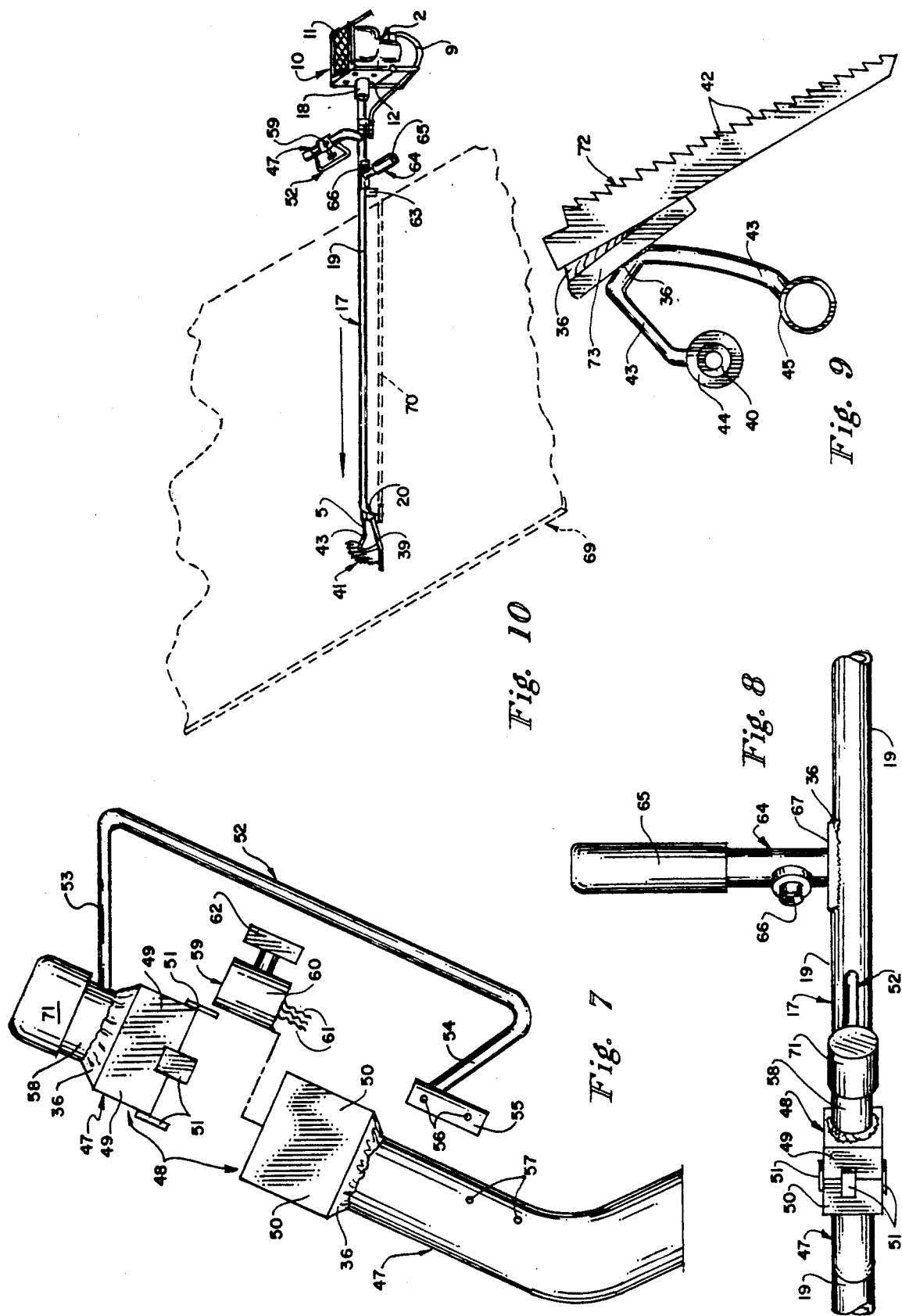

PLYWOOD SAW

BACKGROUND OF THE INVENTION

Field of the Invention

This invention relates to devices for cutting plywood and individual plies which are glued together to form sheets of plywood and more particularly, to a plywood saw for cutting both plywood and ply sheeting. The plywood saw of this invention is characterized by an elongated barrel fitted with a jigsaw at one end, a drive rod extending through the barrel in slidable relationship, with one end of the drive rod attached to the reciprocating blade mount element of the jigsaw and the opposite end of the drive rod pivotally attached to a curved or straight saw blade. Operation of the jigsaw causes the drive rod to reciprocate inside the barrel and operate the saw blade in a rocking action to effect cutting of the plywood or ply.

One of the problems which exists in plywood mills is that of clearing the ply-layout conveyor machinery of kinked, broken and skewed sheeting as the sheeting, or "ply" is cut in a continuous sheet by a knife blade from a rotating log mounted in a mandrel. As the thin sheeting is peeled from the mandrel by the knife blade it is directed by means of rollers in a conveyor system to an area where it is laminated with other sheets or "plies", to form plywood. Occasionally, this thin "ply" is not cut uniformly or for other reasons jams in the conveyor apparatus and must be cleared by hand, thereby necessitating a shutdown of the mandrel and associated ply cutting and conveying apparatus. The sheeting is cleared from the conveyor by means of hand saws and other hand tools, a procedure which sometimes requires a considerable period of time before operation can be resumed.

It is an object of this invention to provide a plywood saw which is capable of quickly and easily clearing the conveyor apparatus in a plywood mill, thereby lessening down-time and increasing mill efficiency.

Another object of the invention is to provide a new and improved plywood saw which is capable of cutting sheets of plywood or one or more plywood "ply", in order to clear the plywood conveyor system of broken, skewed or jammed wood sheeting in a short period of time.

Still another object of the invention is to provide a plywood saw for clearing conveyor systems in plywood mills of plywood sheeting, which plywood saw is characterized by an elongated barrel fitted with a jigsaw at one end, a drive rod provided in the barrel and having one end attached to the reciprocating element of the jigsaw and the opposite end of the drive rod secured to a saw blade which is pivotally mounted on the end of the barrel, in order to facilitate a cutting action in the saw blade responsive to operation of the jigsaw to engage, cut and clear the sheeting from the conveyor system.

Still another object of the invention is to provide a new and improved plywood saw for clearing wooden sheeting from conveyor systems in a plywood mill, which plywood saw includes a jigsaw mechanism, an elongated barrel having one end attached to the jigsaw mechanism, a drive rod provided in the barrel and having one end attached to the reciprocating element of the jigsaw mechanism and a curved saw blade having one segment pivotally secured to the opposite end of the reciprocating rod and another segment pivotally attached to the barrel, whereby operation of the jigsaw facilitates a rocking or oscillating action of the curved saw blade to enable cutting and clearing of the wooden sheeting from the conveyor system.

Still another object of the invention is to provide a plywood saw for clearing wooden sheeting of various thickness from conveyor systems in a plywood mill, which plywood saw includes a jigsaw mechanism, an elongated barrel attached at one end to the jigsaw mechanism, a drive rod provided in the barrel and having one end attached to the reciprocating element of the jigsaw mechanism and a curved saw blade having one segment pivotally secured to the opposite end of the reciprocating rod and another element pivotally attached to the opposite end of the barrel, whereby operation of the jigsaw facilitates an oscillating action of the curved saw blade to enable cutting and clearing of the wooden sheeting from the conveyor system.

SUMMARY OF THE INVENTION

These and other objects of the invention are provided in a new and improved plywood saw for clearing a wooden "ply" or plies from a conveyor system in a plywood mill, which saw is characterized in a preferred embodiment by an elongated barrel fitted with spaced guides located in the bore thereof, a jigsaw mounted on one end of the barrel and a blade pivot bar provided at the opposite end of the barrel, a rod located in the barrel and extending through the guides, with one end of the rod attached to the reciprocating element of the jigsaw and the opposite end thereof secured to a blade, wherein the blade is also secured to the blade pivot bar, for operating the blade in a reciprocating, oscillating or rocking fashion responsive to operation of the jigsaw and cutting the wooden ply or plies.

BRIEF DESCRIPTION OF THE DRAWINGS

The invention will be better understood by reference to the accompanying drawings wherein:

FIG. 1 is a side view of a preferred embodiment of the plywood saw of this invention;

FIG. 2 is a top view of the cutting end of the plywood saw illustrated in FIG. 1;

FIG. 3 is a sectional view taken along line 3—3 of the cutting end of the plywood saw illustrated in FIG. 1;

FIG. 4 is a front view of the plywood saw illustrated in FIG. 1;

FIG. 5 is a top view of the drive end of the plywood saw illustrated in FIG. 1;

FIG. 6 is an enlarged sectional view of the barrel, rod guide and drive rod components of the plywood saw illustrated in FIGS. 1-5;

FIG. 7 is an exploded view of a preferred right-hand arm for supporting and operating the plywood saw illustrated in FIG. 1;

FIG. 8 is a top view of the right-hand arm illustrated in FIG. 7 and a left-hand arm for stabilizing the plywood saw illustrated in FIG. 1;

FIG. 9 is a side view of an alternative preferred straight saw blade for use in the plywood saw of this invention; and FIG. 10 is a perspective view of the plywood saw illustrated in FIG. 1 superimposed for cutting purposes on a plywood sheet (illustrated in phantom).

DESCRIPTION OF THE PREFERRED EMBODIMENTS

Referring initially to FIGS. 1-6 of the drawings, the plywood saw of this invention is generally illustrated by reference numeral 1. The plywood saw 1 is characterized by a jigsaw 2 located at the drive end thereof, which jigsaw 2 includes a jigsaw housing 3, containing an electric motor (not illustrated) and fitted with a housing base 4 for mounting on the front guard segment 12 of a jigsaw guard 10. A reciprocating rod mount 6 is attached to the extending end of a reciprocating rod (not illustrated) which is attached to the shaft of the electric motor (not illustrated) that powers the jigsaw 2, in conventional fashion. The rod mount 6 is normally designed to receive a jigsaw blade (not illustrated) in conventional fashion, to facilitate operation of the jigsaw 2 to cut wood. The enlarged mount end 18 of an elongated barrel 17 is welded or otherwise secured to the front guard segment 12 of the jigsaw guard 10 and the opposite end of the barrel 17 is turned downwardly define a saw end 20. One end of a vibration brace 9 is attached to the barrel 17 by means of spaced brace brackets 9a and the vibration brace 9 extends around the end of the front guard segment 12 and is secured to a brace bracket 9a by means of a nut 34, as illustrated in FIG. 1. A brace hinge 14 is provided in the vibration brace 9 to facilitate loosening of the nut 34 and extending the rear portion of the vibration brace 9 downwardly at the brace hinge 14 for maintaining or replacing the jigsaw 2. A rod stabilizer 22 projects from the curve of the saw end 20 in alignment with a longitudinal axis of the intermediate segment 19 of the barrel 17 and a drive rod 5 is fitted inside the barrel 17 and is aligned with and extended through multiple tube inserts 31, provided in guide tubes 28, located in spaced rod guides 27. Each of the tube inserts 31 is preferably characterized by plastic or other friction-reducing material, in order to accommodate the drive rod 5 in reciprocating relationship, as hereinafter further described. Each guide tube 28 is attached to a corresponding guide saddle 29 by means of a saddle web 30, and the guide saddles 29 are welded in spaced slots (not illustrated) provided in the intermediate segment 19 of the barrel 17, as illustrated in FIG. 6. Accordingly, it will be appreciated from a consideration of FIGS. 1, 2 and 6 of the drawings that the drive rod 5 is mounted in reciprocating fashion inside each of the tube inserts 31 positioned in spaced relationship in the center of the intermediate segment 19. One end of the drive rod 5 is attached to the rod mount 6 by means of an allen screw 35, as illustrated in FIG. 1, while the opposite end of the drive rod 5 projects from the rod stabilizer 22 and receives a blade mount 37. The blade mount 37 is provided with a transverse opening (not illustrated) designed to receive a blade mount bolt 38 in transverse relationship and pivotally attach one end of a blade mount bracket 43, to the blade mount 37, as further illustrated in FIGS. 1-4. The opposite end of the reverse C-shaped blade mount bracket 43 is pivotally secured to a blade pivot bar 24, which is welded to the saw end 20 of the barrel 17 and the blade mount bracket 43 is welded to or shaped integrally with a curved blade 41, provided with mutiple blade teeth 42. In a most preferred embodiment of the invention, the ends of the blade mount bracket 43 are provided with a top bracket spacer 44 and a bottom bracket spacer 45, respectively, as illustrated in FIG. 4, and are secured to the blade mount 37 and the blade pivot bar 24, respectively, by means of a blade mount bolt 38 and a pivot bar bolt 25, respectively, as further illustrated in FIG. 4. The top bracket spacer 44 is fitted on the top end of the blade mount bracket 43 and the bottom bracket spacer 45 is provided on the bottom end of the blade mount bracket 43, in order to receive the blade mount bolt 38 and the pivot bar bolt 25, respectively, and better pivotally secure the top end of the blade mount bracket 43 to the blade mount 37 and the bottom end of the blade mount bracket 43 to the blade pivot bar 24. It will be appreciated from further consideration of FIG. 4 that the blade mount bolt 38 and the pivot bar bolt 25 are threaded into the blade mount 37 and the blade pivot bar 24, respectively. Alternatively, it will be recognized by those skilled in the art that the blade mount bolt 38 and the pivot bar bolt 25 can be replaced by pins which are extended through the blade mount 37 and the blade pivot bar 24, respectively, and secured by means of cotter pins (not illustrated) or like retainers, as desired.

Referring again to FIGS. 1 and 6 of the drawings, multiple vents 32 are provided in the intermediate segment 19 of the barrel 17 and the vents 32 communicate with the interior of the barrel 17 to facilitate circulation of air in the barrel bore 23 of the barrel 17 and dissipation of heat resulting from reciprocation of the drive rod 5 inside the tube inserts 31 of the rod guides 27. As further illustrated in FIG. 1, a contact plate 21 is provided on the downwardly-extending saw end 20 of the barrel 17, to facilitate contact with a length of wood sheeting 69, illustrated in phantom. Moreover, a rib 26 is welded along the bottom of the intermediate segment 19 of the barrel 17, to protect the barrel 17 from damage due to incidental contact with the wood sheeting 69 and a U-shaped blade guard 39 extends around the curved blade 41 and is welded at the ends to the saw end 20, as illustrated in FIGS. 1-4.

Referring again to FIGS. 1 and 5 of the drawings, in a most preferred embodiment of the invention the jigsaw guard 10 includes a top guard segment 11, which extends in perpendicular relationship from the front guard segment 12 and both the top guard segment 11 and the front guard segment 12 include an expanded metal screen 15, as illustrated in FIG. 5. Furthermore, a power supply cord 7 projects from the jigsaw housing 3 and is fitted with a plug 8 at the extending end thereof to facilitate supplying power to the electric motor (not illustrated) located in the jigsaw housing 3. Moreover, a switch cord 16 extends from the jigsaw housing 3 around the vibration brace 9 and enters an opening (not illustrated) provided in the intermediate segment 19 of the barrel 17, where it extends through a right-hand arm 47 and is wired to a switch (not illustrated) located in the right-hand arm 47, as hereinafter further described. The switch cord 16 is secured to the vibration brace 9 by means of tape 68.

Referring now to FIGS. 1, 7 and 8 of the drawings, in another preferred embodiment of the invention the right-hand arm 47 projects upwardly and outwardly from a weld 36 at the barrel 17 to the right thereof, as the barrel 17 is viewed from the jigsaw 2. The right-hand arm 47 is further characterized by a right-hand grip 48, having a top grip segment 49 and a bottom grip segment 50. As illustrated in FIG. 7, the top grip segment 49 is designed to be detached from the bottom grip segment 50, to facilitate installation and removal of a switch 59, which is characterized by a switch housing 60, with switch wiring 61 extending therefrom, and a trigger 62. The switch wiring 61 is designed for wiring with the switch cord 16, illustrated in FIG. 1, in order to operate the jigsaw 2 by pressing the trigger 62 of the switch 59. The top bail segment 53 of a C-shaped bail 52 is welded or otherwise securely attached to the arm cap 58 of the top grip segment 49, while the bottom segment 54 of the bail 52 is secured to a bail mount bracket 55. The bail mount bracket 55 is in turn, attached to the right-hand arm 47 beneath the bottom grip segment 50 by means of fasteners (not illustrated) which extend through bracket openings 56, provided in the bail mount bracket 55 and thread into the internally-threaded arm openings 57, located in the right-hand arm 47, as further illustrated in FIG. 7. Accordingly, the top grip segment 49 may be disassembled from the bottom grip segment 50 of the right-hand grip 48 by removing these fasteners and thereby detaching the bottom bail segment 54 from the right-hand arm 47 and allowing the top grip segment 49 to be removed from the bottom grip segment 50. This expedient facilitates removal and replacement of the switch 59, which fits inside the hollow interior of the top grip segment 49 and bottom grip segment 50, as deemed necessary. The alignment tabs 51 which project from the top grip segment 49 are designed to be aligned with the bottom grip segment 50, in order to accurately secure the top grip segment 49 on the bottom grip segment 50 during reassembly. In yet another most preferred embodiment of the invention, both the top grip segment 49 and the bottom grip segment 50 are constructed from square metal tubing and the bottom grip segment 50 is welded to the top end of the round metal tubing right-hand arm 47 at a weld 36. Moreover, the arm cap 58 may also be constructed of round metal tubing and may be welded to the top grip segment 49 at another weld 36 and capped by a rubber cap end 71. As illustrated in FIG. 8, a left-hand arm 64 is welded to the intermediate segment 19 of the barrel 17 by means of an arm plate 67 and projects outwardly of the intermediate segment 19 in a left-hand configuration when viewed from the jigsaw 2. A left-hand grip 65 is provided on the left-hand arm 64 and a kill switch 66 is wired into the switch cord 16, illustrated in FIG. 1, in order to facilitate immediate termination of operation of the jigsaw 2 upon pressing the kill switch 66. As further illustrated in FIG. 1, a hand guard 63 is welded to the intermediate segment 19 of the barrel 17 near the left-hand arm 64, in order to protect the hands of a user who is gripping the right-hand arm 47 and the left-hand arm 64.

In operation, and referring now to FIGS. 1 and 10 of the drawings, the plywood saw 1 is designed to cut one or more plies of a wood sheeting 69 by first grasping the left-hand arm 64 at the left-hand grip 65 with the left hand and then grasping the right-hand arm 47 at the top grip segment 49 and bottom grip segment 50, respectively, with the right hand as the user stands behind the jigsaw 2 and faces the barrel 17. Operation of the jigsaw 2 is commenced by pressing the trigger 62 of the switch 59 to energize the electric motor (not illustrated) in the jigsaw 2 and effect operation of the curved blade 41 in a rocking or oscillating motion which defines an arc that corresponds to the length of travel of the drive rod 5 located in the barrel 17. The contact plate 21, mounted on the saw end 20 of the barrel 17, is then placed flat on the top of the plywood 69 and the blade teeth 42 are engaged with the plywood 69 to begin the saw cut 70, as illustrated in FIG. 10. Pressure is exerted forwardly against the right-hand arm 47 and the left-hand arm 64 to cut the wood sheeting 69 along the saw cut 70. Due to the length of the barrel 17, the plywood saw 1 can be utilized to cut sheeting 69 which extends across the entire width of a conveyor system or systems in a plywood mill.

Referring now to FIG. 9 of the drawings, a straight blade 72 can also be used in the plywood saw 1 in the same manner as the curved blade 41 illustrated in FIGS. 1-3 and 10. The straight blade 72 is fitted with a straight blade adaptor or mount 73 that is attached to the blade mount bracket 43 by means of a weld 36. A top bracket spacer 44, mounted on the top end of the blade mount bracket 43 and a bottom bracket spacer 45 is welded or otherwise attached to the bottom end of the blade mount bracket 43. An optional bushing 40 may be provided in the top bracket cylinder 44, if so desired. Operation of the straight blade 72 in a reciprocating, oscillating or rocking fashion effects the saw cut 70 in the manner illustrated in FIG. 10, as heretofore described.

It will be understood by those skilled in the art that an air-operated or hydraulic jigsaw can also be used to drive the drive rod and blade, with appropriate pneumatic or hydraulic switches used, as necessary, to both operate and stop the pneumatic or hydraulic jigsaw.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A saw for cutting wood sheeting comprising a jigsaw having a reciprocating element, an electric motor connected in reciprocating relationship to said reciprocating element, an elongated barrel having one end attached to said jigsaw and an opening provided in the opposite end of said barrel, a drive rod slidably disposed in said barrel, with one end of said drive rod carried by said reciprocating element and the opposite end of said drive rod projecting through said opening blade means pivotally carried by said opposite end of said drive rod and said opposite end of said barrel, first arm means carried by said barrel and an operating switch provided on said first arm means, said operating switch electrically connected to said electric motor for energizing said electric motor and operating said jigsaw and said blade means and second arm means carried by said barrel and a kill switch provided on said second arm means, said kill switch electrically connected to said electric motor for terminating operation of said electric motor and operation of said jigsaw and blade means, whereby reciprocation of said reciprocating element and said drive rod responsive to operation of said jigsaw causes rocking or oscillation of said blade means in an arc for cutting the wood sheeting.

2. The saw of claim 1 wherein said opposite end of said barrel is turned downwardly and further comprising a contact plate provided on said opposite end of said barrel for contacting the wood sheeting during operation of said saw.

3. The saw of claim 1 further comprising a bottom grip segment and a top grip segment provided in said first arm means and bail means having one end fixedly attached to said top grip segment and the opposite end of said bail means removably attached to said bottom grip segment and wherein said operating switch is mounted in said bottom grip segment.

4. The saw of claim 1 further comprising second arm means carried by said barrel and a kill switch provided on said second arm means, said kill switch electrically connected to said electric motor for terminating operation of said electric motor and operation of said jigsaw and said blade means.

5. The saw of claim 4 wherein said opposite end of said barrel is turned downwardly and further comprising a contact plate provided on said opposite end for contacting the wood sheeting during operation of said saw.

6. The saw of claim 1 further comprising at least one vent provided in said barrel for circulating air through said barrel and around said drive rod and a vibration brace having one end carried by said barrel and the opposite end of said vibration brace attached to said jigsaw.

7. The saw of claim 1 wherein said opposite end of said barrel is turned downwardly and further comprising a plurality of vents provided in said barrel for circulating air through said barrel and around said drive rod and a contact plate provided on said opposite end for contacting the wood sheeting during operation of said saw.

8. The saw of claim 7 further comprising a bottom grip segment and a top grip segment provided in said first arm means and bail means having one end fixedly attached to said top grip segment and the opposite end of said bail means removably attached to said bottom grip segment and wherein said operating switch is mounted in said bottom grip segment.

9. The saw of claim 1 wherein said opposite end of said barrel is turned downwardly and further comprising a plurality of vents provided in said barrel for circulating air through said barrel and around said drive rod; a contact plate provided on said opposite end for contacting the wood sheeting during operation of said saw; and a bottom grip segment and a top grip segment provided in said first arm means, bail means having one end fixedly attached to said top grip segment and the opposite end of said bail means removably attached to said bottom grip segment and wherein said operating switch is mounted in said bottom grip segment.

10. A plywood saw for cutting wood sheeting comprising a jigsaw having an electric motor and a reciprocating element connected to said electric motor; an elongated barrel having one end attached to said jigsaw in substantially longitudinal alignment with said barrel and an opening provided in the opposite end of said barrel, with said opposite end of said barrel turned downwardly below said opening to define a sheeting contact surface; a plurality of guide means disposed in said barrel in spaced relationship; a drive rod slidably disposed in said guide means, with one end of said drive rod connected to said reciprocating element and the opposite end of said drive rod projecting through said opening; first arm means carried by said barrel and an operating switch provided on said first arm means, said operating switch electrically connected to said electric motor for energizing said electric motor and operating said jigsaw and said blade means; second arm means carried by said barrel and a kill switch provided on said second arm means, said kill switch electrically connected to said electric motor for terminating operation of said electric motor and operation of said jigsaw and said blade means; and blade means pivotally carried by said opposite end of said drive rod and said opposite end of said barrel, whereby reciprocation of said reciprocating element of said jigsaw and said drive rod responsive to manipulation of said operating switch and operation of said jigsaw causes oscillation of said blade means for cutting the wood sheeting.

11. The plywood saw of claim 10 further comprising a plurality of vents provided in said barrel for circulating air through said barrel and around said drive rod and a blade guard carried by said barrel and extending around said blade means for shielding said blade means and contacting the wood sheeting for guiding said blade means through the wood sheeting.

12. The plywood saw of claim 11 further comprising a bottom grip segment and a top grip segment provided in said first arm means and bail means having one end fixedly attached to said top grip segment and the opposite end of said bail means removably attached to said bottom grip segment and wherein said operating switch is mounted in said bottom grip segment.

13. A plywood saw for cutting single and multiple plies of plywood, comprising a jigsaw provided with a motor and a reciprocating element driven by the motor; an elongated barrel having one end secured to said jigsaw and the opposite end of said barrel turned downwardly at substantially a 90 degree angle; a plurality of vents provided in said barrel in spaced relationship for circulating air through said barrel and around said drive rod; an opening provided in said opposite end of said barrel substantially in alignment with the longitudinal axis of said barrel; a plurality of ring-shaped guides provided in said barrel in spaced relationship; a drive rod slidably disposed in said guides, with one end of said drive rod attached to said reciprocating element of said jigsaw and the opposite end of said drive rod projecting through said opening; a pivot bar fixedly secured to said opposite end of said barrel below said opening, said pivot bar extending outwardly of said barrel substantially parallel to said opposite end of said drive rod; a first arm carried by said barrel and an operating switch provided on said first arm, said operating switch connected to said motor for energizing said motor and operating said jigsaw; a second arm carried by said barrel and a kill switch provided on said second arm, said kill switch connected to said motor for terminating operation of said motor and operation of said jigsaw; and blade means pivotally carried by the opposite end of said drive rod and said pivot bar, whereby operation of said jigsaw causes reciprocation of said reciprocating element and said drive rod and oscillation of said blade means for cutting the plywood.

14. The plywood saw of claim 13 further comprising a bottom grip segment and a top grip segment provided in said first arm means and bail means having one end fixedly attached to said top grip segment and the opposite end of said bail means removably attached to said bottom grip segment and wherein said operating switch is mounted in said bottom grip segment.

15. The plywood saw of claim 14 further comprising a contact plate provided on said opposite end of said barrel and a blade guard carried by said barrel and extending around said blade means for shielding said blade means and contacting the wood sheeting for guiding said blade means through the wood sheeting.

16. The plywood saw of claim 15 further comprising a vibration brace having one end carried by said barrel and the opposite end of said vibration brace attached to said jigsaw.

* * * * *